US006531547B1

(12) United States Patent
Visger et al.

(10) Patent No.: US 6,531,547 B1
(45) Date of Patent: Mar. 11, 2003

(54) VINYL AROMATIC-(VINYL AROMATIC-CO-ACRYLIC) BLOCK COPOLYMERS PREPARED BY STABILIZED FREE RADICAL POLYMERIZATION

(75) Inventors: Daniel C. Visger, Mentor, OH (US); Richard M. Lange, Euclid, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/717,751

(22) Filed: Nov. 21, 2000

Related U.S. Application Data

(63) Continuation-in-part of application No. 09/047,734, filed on Mar. 25, 1998, now abandoned.

(51) Int. Cl.$^7$ .............................................. C08F 293/00
(52) U.S. Cl. ...................... 525/244; 525/256; 525/263; 525/267; 525/273; 525/299; 525/301; 525/309; 508/110
(58) Field of Search ................................ 525/242, 244, 525/263, 267, 256, 260, 273, 299, 301, 309

(56) References Cited

U.S. PATENT DOCUMENTS

| | | | |
|---|---|---|---|
| 3,189,663 A | | 6/1965 | Nozaki |
| 3,892,822 A | * | 7/1975 | Frechtling |
| 4,136,047 A | | 1/1979 | Rogan et al. ............. 252/56 R |
| 5,194,510 A | | 3/1993 | DuBois ...................... 525/299 |
| 5,312,871 A | | 5/1994 | Mardare et al. ............. 525/272 |
| 5,322,912 A | | 6/1994 | Georges et al. ............. 526/204 |
| 5,371,149 A | | 12/1994 | Kishida et al. ............. 525/309 |
| 5,401,804 A | | 3/1995 | Georges et al. ............. 525/267 |
| 5,412,047 A | | 5/1995 | Georges et al. ............. 526/204 |
| 5,449,724 A | | 9/1995 | Moffat et al. ............... 526/204 |
| 5,498,679 A | | 3/1996 | Moffat et al. ............... 526/204 |
| 5,530,079 A | | 6/1996 | Veregin et al. .......... 526/219.3 |
| 5,552,502 A | | 9/1996 | Odell et al. ................. 526/234 |
| 5,608,023 A | | 3/1997 | Odell et al. ................. 526/225 |
| 5,627,248 A | | 5/1997 | Koster et al. ............... 526/217 |
| 5,677,388 A | | 10/1997 | Koster et al. ............... 525/314 |
| 5,714,993 A | * | 2/1998 | Keoshkerian ................ 347/95 |
| 5,721,320 A | | 2/1998 | Priddy et al. ............... 525/316 |
| 5,728,747 A | | 3/1998 | Kazmaier et al. ............ 522/11 |
| 5,744,560 A | * | 4/1998 | Foucher et al. ............. 526/221 |

FOREIGN PATENT DOCUMENTS

| | | |
|---|---|---|
| DE | 197 04 714 A | 7/1997 |
| EP | 0 780 733 A | 6/1997 |
| EP | 0 887 362 A | 12/1998 |
| WO | WO 94/11412 | 5/1994 |
| WO | WO 95/31484 | 11/1995 |

OTHER PUBLICATIONS

Butz et al., Macromol. Rapid Communications, 18 (12), p. 1049–1055 (1997).*
Derwent Abstract 97–386778 (Re DE 197 94 714).

* cited by examiner

Primary Examiner—Jeffrey Mullis
(74) Attorney, Agent, or Firm—David M. Shold; Michael F. Esposito

(57) ABSTRACT

A process for preparing a block copolymer. In one embodiment, the block copolymers comprise (A) a poly (vinyl aromatic) block and (B) a poly (vinyl aromatic-co-acrylic) block, said process comprising the steps, (a) polymerizing at an elevated temperature from about 5 to about 95 mole % of a charge comprising at least one vinyl aromatic monomer to prepare a stabilized active polymer block (A), using a free radical polymerization process, wherein a stable free radical agent is employed during the polymerization, thereby preserving the stabilized active polymerization site at the terminus of the poly (vinyl aromatic) block (A);

(b) adding at least one acrylic monomer and optionally, additional vinyl aromatic monomer, to the mixture of vinyl aromatic monomer and stabilized active polymer block of (a); and (c) further reacting the mixture of (b) using a free radical process to effect copolymerization of said monomers, thereby preparing a (vinyl aromatic-co-acrylate) block (B).

The present invention also relates to block copolymers prepared by the above process, additive concentrates for preparing lubricating oil compositions and lubricating oil compositions. In other embodiments, the present invention relates to block copolymers having more than two blocks.

41 Claims, No Drawings

VINYL AROMATIC-(VINYL AROMATIC-CO-ACRYLIC) BLOCK COPOLYMERS PREPARED BY STABILIZED FREE RADICAL POLYMERIZATION

CROSS REFERENCE TO RELATED APPLICATIONS

This is a continuation-in-part of application(s) Ser. No. 09/047,734 filed Mar. 25, 1998, now abandoned the disclosure of which hereby incorporated herein by reference in its entirety.

FIELD OF THE INVENTION

The present invention relates to a process for preparing block copolymers, block copolymers prepared by the process, additive concentrates and lubricating oil compositions.

BACKGROUND OF THE INVENTION

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity modifiers or viscosity index improvers. Block copolymers are a known class of viscosity improvers.

Dispersants are also well-known in the lubricating art. Dispersants are employed in lubricants to keep impurities, particularly those formed during operation of mechanical devices such as internal combustion engines, automatic transmissions, etc. in suspension rather than allowing them to deposit as sludge or other deposits on the surfaces of lubricated parts.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185–193; C. V. Smalheer and R. K. Smith "Lubricant Additives", Lezius-Hiles Co. (1967); M. W. Ranney, "Lubricant Additives", Noyes Data Corp. (1973), pp 92–145, M. W. Ranney, "Lubricant Additives, Recent Developments", Noyes Data Corp. (1978), pp 139–164; and M. W. Ranney, "Synthetic Oils and Additives for Lubricants", Noyes Data Corp. (1980), pp 96–166. Each of these publications is hereby expressly incorporated herein by reference.

Dispersant-viscosity improvers are generally prepared by functionalizing, i.e., adding polar groups, to a hydrocarbon polymer backbone.

Hayashi, et al, U.S. Pat. No. 4,670,173 relates to compositions suitable for use as dispersant-viscosity improvers made by reacting an acylating reaction product which is formed by reacting a hydrogenated block copolymer and an alpha-beta olefinically unsaturated reagent in the presence of free-radical initiators, then reacting the acylating product with a primary amine and optionally with a polyamine and a mono-functional acid.

Chung et al, U.S. Pat. No. 5,035,821 relates to viscosity index improver-dispersants comprised of the reaction products of an ethylene copolymer grafted with ethylenically unsaturated carboxylic acid moieties, a polyamine having two or more primary amino groups or polyol and a high functionality long chain hydrocarbyl substituted dicarboxylic acid or anhydride.

Van Zon et al, U.S. Pat. No. 5,049,294, relates to dispersant/VI improvers produced by reacting an alpha, beta-unsaturated carboxylic acid with a selectively hydrogenated star-shaped polymer then reacting the product so formed with a long chain alkane-substituted carboxylic acid and with a $C_1$ to $C_{18}$ amine containing 1 to 8 nitrogen atoms and/or with an alkane polyol having at least two hydroxy groups or with the performed product thereof.

Bloch et al, U.S. Pat. No. 4,517,104, relates to oil soluble viscosity improving ethylene copolymers reacted or grafted with ethylenically unsaturated carboxylic acid moieties then with polyamines having two or more primary amine groups and a carboxylic acid component or the preformed reaction product thereof.

Gutierrez et al, U.S. Pat. No. 4,632,769, describes oil-soluble viscosity improving ethylene copolymers reacted or grafted with ethylenically unsaturated carboxylic acid moieties and reacted with polyamines having two or more primary amine groups and a $C_{22}$ to $C_{28}$ olefin carboxylic acid component.

Each of these patents is hereby expressly incorporated herein by reference.

For additional disclosures concerning multi-purpose additives and particularly viscosity improvers and dispersants, the disclosures of the following United States patents are incorporated herein by reference:

| | | |
|---|---|---|
| 2,973,344 | 3,488,049 | 3,799,877 |
| 3,278,550 | 3,513,095 | 3,842,010 |
| 3,311,558 | 3,563,960 | 3,864,098 |
| 3,312,619 | 3,598,738 | 3,864,268 |
| 3,326,804 | 3,615,288 | 3,879,304 |
| 3,403,011 | 3,637,610 | 4,033,889 |
| 3,404,091 | 3,652,239 | 4,051,048 |
| 3,445,389 | 3,687,849 | 4,234,435 |

U.S. Pat. No. 5,530,079, Veregin et al., discloses a polymerization process comprising heating a mixture of a free radical initiator, a stable free radical agent, at least one polymerizable monomer compound, and optionally a solvent.

U.S. Pat. No. 5,401,804, Georges et al., discloses a free radical polymerization process comprising heating a mixture of a free radical initiator, a stable free radical agent, and at least one polymerizable monomer. The stable free radical agent includes nitroxide free radicals. An organic sulfonic or carboxylic acid can be added to increase the rate of polymerization.

U.S. Pat. No. 3,189,663, Nozaki, discloses block copolymers comprising copolymers where the macromolecules are made up of at least two different linear segments. The first is made up of a linear polymer of a member of the group consisting of ethylenically unsaturated carboxylic acids, anhydrides thereof, and their esters and amides. The second segment is made up of a polymer of a dissimilar member of the first group, esters of unsaturated alcohols and saturated acids, alkenes, alkadienes, vinyl halides, vinyl substituted aromatic hydrocarbons, alkenyl-substituted halohydrocarbons, and alkenyl ethers.

U.S. Pat. No. 4,581,429, Solomon et al., discloses a process for free radical polymerization to produce relatively short chain length homo- and copolymers. The initiator has the general formula

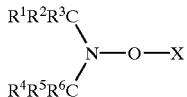

U.S. Pat. No. 5,608,023, Odell et al., discloses a polymerization process comprising heating a mixture of a free radical initiator, a stable free radical agent, at least one polymerizable monomer compound, and a sulfonic acid salt polymerization rate enhancing compound to form thermoplastic resins.

U.S. Pat. No. 5,449,724, Moffatt et al., discloses a free radical polymerization process which includes heating a mixture comprised of a free radical initiator, a stable free radical agent, and ethylene.

U.S. Pat. No. 5,677,388, Koster et al., relates to a living free-radical polymerization process for preparing polymers from vinyl aromatic monomers comprising polymerizing the vinyl aromatic monomer in the presence of a difunctional nitroxyl initiator.

An object of this invention is to provide a novel process for preparing block copolymers.

Another object is to provide a one-pot, relatively short duration process for preparing block copolymers.

Another object is to provide block copolymers which may be isolated as diluent-free, dry, free-flowing solids.

Another object of this invention is to provide novel block copolymers useful as lubricant additives.

Still another object is to provide lubricants having improved shear stability and viscometric properties.

A more specific object is to provide additives directed to improving lubricant viscometrics.

Other objects will in part be obvious in view of this disclosure and will in part appear hereinafter.

SUMMARY OF THE INVENTION

The present invention provides a process for preparing a block copolymer. In one embodiment, the block copolymers comprise (A) a poly (vinyl aromatic) block and (B) a poly (vinyl aromatic-co-acrylic) block, said process comprising the steps, (a) polymerizing at an elevated temperature from about 5 to about 95 mole % of a charge comprising at least one vinyl aromatic monomer to prepare a stabilized active polymer block (A), using a free radical polymerization process,
wherein a stable free radical agent is employed during the polymerization, thereby preserving the stabilized active polymerization site at the terminus of the poly (vinyl aromatic) block (A);

(b) adding at least one acrylic monomer and optionally, additional vinyl aromatic monomer, to the mixture of residual vinyl aromatic monomer and stabilized active polymer block of (a); and (c) further reacting the mixture of (b) using a free radical process to effect copolymerization of said monomers, thereby preparing a poly(vinyl aromatic-co-acrylate) block (B).

The present invention also relates to block copolymers prepared by the above process, additive concentrates for preparing lubricating oil compositions and lubricating oil compositions. In other embodiments, the present invention relates to block copolymers having more than two blocks.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms provided that they do not adversely affect reactivity or utility of the process or products of this invention.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated into a lubricating oil. For a further discussion of the terms oil soluble and dispersible, particularly "stably dispersible", see U.S. Pat. No. 4,320,019 which is expressly incorporated herein by reference for relevant teachings in this regard.

The expression "lower" is used throughout the specification and claims. As used herein to describe various groups, the expression "lower" is intended to mean groups containing no more than 7 carbon atoms, more often, no more than 4, frequently one or two carbon atoms.

It must be noted that as used in this specification and appended claims, the singular forms also include the plural unless the context clearly dictates otherwise. Thus the singular forms "a", "an", and "the" include the plural; for example "a monomer" includes mixtures of monomers of the same type. As another example the singular form "monomer" is intended to include both singular and plural unless the context clearly indicates otherwise.

In the context of this invention the term "copolymer" means a polymer derived from two or more different monomers. Thus, a polymer derived from a mixture of, for example, methyl-, butyl-, $C_{9-11}$-, and $C_{12-18}$- methacrylates, or a polymer having two or more distinct blocks, is a copolymer as defined herein. The copolymers of this invention also may contain units derived from nitrogen-containing monomers.

The expression "substantially inert" is used in reference to diluents. When used in this context, "substantially inert" means the diluent is essentially inert with respect to any reactants or compositions of this invention, that is, it will not, under ordinary circumstances, undergo any significant reaction with any reactant or composition, nor will it interfere with any reaction or composition of this invention.

The expression viscosity index (often abbreviated VI) is frequently used herein. Viscosity index is an empirical number indicating the degree of change in viscosity within a given temperature range. A high VI signifies an oil that displays a relatively small change in viscosity with temperature.

The Vinyl Aromatic Monomer

In the present invention one of the monomers is a vinyl substituted aromatic compound The vinyl substituted aromatics generally contain from 8 to about 20 carbons, preferably from 8 to 12 carbon atoms and most preferably, 8 or 9 carbon atoms. Heterocyclic compounds having, for example sulfur, oxygen or nitrogen ring heteroatoms, such as vinyl pyridines are contemplated.

Examples of vinyl substituted aromatics include vinyl anthracenes, vinyl naphthalenes and vinyl benzenes (styrenes) including substituted styrenes. Substituted styrenes include styrenes that have substituents on the ring or on the vinyl group. Such substituents include halo-, amino-, alkoxy-, carboxy-, hydroxy-, sulfonyl-, hydrocarbyl- wherein the hydrocarbyl group has from 1 to about 12 carbon atoms, and other substituents. Examples of styrenes include styrene, alpha-lower alkyl substituted styrene, for example, alpha-methyl styrene and alpha-ethyl styrene, styrenes having ring substituents, preferably, lower alkyl ring substituents, for example, ortho-methyl styrene, meta-methyl styrene, para-methyl styrene, and para-tertiary-butylstyrene, vinyl benzene sulfonic acid, and para-lower alkoxy styrene. Mixtures of two or more vinyl aromatic monomers can be used. Styrene is preferred.

The Acrylic Monomer

As used herein the term "acrylic monomer" includes acrylic acids, esters of acrylic acids, acrylic amides, and acrylonitriles and the corresponding alkacryl-, especially methacryl-, compounds, particularly alkyl methacrylates, methacrylamides, and methacrylonitrile. The esters of acrylic acids typically contain from 2 to about 50 carbon atoms in the ester group, which ester group includes the carbonyl carbon atom. Often, the ester groups are lower alkyl esters, wherein the expression "lower alkyl" means alkyl groups having fewer than 7 carbon atoms, preferably from 1 to about 4 carbons. In another preferred embodiment, the ester group contains from 2 to about 30 carbon atoms, preferably from about 9 to about 23 carbon atoms, often from about 8 to about 18 carbon atoms. In an especially preferred embodiment, the ester group contains a mixture of alkyl groups, such as from about 9 to about 11 carbon atoms, from about 11 to about 16 carbon atoms or from about 13 to about 16 carbon atoms. As defined herein, the expression "ester group" includes the ester carbonyl carbon atom. Thus, for example, a methyl ester contains two carbon atoms in the ester group.

Examples of useful acrylic monomers include acrylic acid, methacrylic acid, esters thereof, including lower alkyl esters, fatty esters, and mixed esters, such as $C_{8-10}$ alkyl esters and $C_{12-15}$ alkyl esters, acrylamide, methacrylamide, and N- and N,N-substituted acrylamides and the corresponding methacrylamides, acrylonitrile and methacrylonitrile.

Also included among acrylic monomers are $\alpha,\beta$-unsaturated polycarboxylic monomers or functional equivalents thereof. Encompassed within this group are acids, carbonyl halides, esters, acid-esters, anhydrides, amides, amidic acids and esters thereof. These include acids such as maleic acid, fumaric acid, crotonic acid, citraconic acid, itaconic acid and mesaconic acid, as well as their corresponding anhydrides, carbonyl halides, amides, amidic acids, amidic esters, and the full and partial esters (especially lower alkyl esters) thereof. Maleic acid and maleic anhydride, especially the latter, are particularly preferred, as are the corresponding fumaric and itaconic compounds.

In one embodiment, instead of employing monomers that are derivatives of acrylic acid or anhydride monomers, copolymers may be prepared employing an acid or anhydride monomer then reacting the acid or anhydride containing copolymer with a suitable alcohol and/or amine to generate a copolymer containing ester and/or amide groups. These are particularly valuable when the copolymer is intended for use as a performance enhancing additive for lubricants or fuels.

Preferably, the vinyl aromatic monomer is selected from the group consisting of styrenes and the acrylic monomer is selected from the group consisting of acrylic acids, esters of acrylic acids, acrylic amides, and acrylonitriles, maleic acid and maleic anhydride. More preferably, the styrenes comprise at least one of styrene, an $\alpha$-lower alkyl substituted styrene, vinyl benzene sulfonic acid, and styrenes having $C_{14}$ alkyl ring substituents, especially styrene, and the acrylic monomer comprises at least one methacrylic acid ester. In another preferred embodiment, the acrylic monomer comprises maleic anhydride.

Stable Free Radical Agent

Stable free radical agents are known. Suitable stable free radical agents include phenoxy radicals and nitroxy radicals. Examples of phenoxy radicals include phenoxy radicals substituted in the 2 and 6 positions by bulky groups such as tert-alkyl (e.g., t-butyl), phenyl, or dimethylbenzyl, and optionally substituted at the 4 position by an alkyl, alkoxyl, aryl, or aryloxy group or by a heteroatom containing group (e.g., S, N, or O) such as a dimethylamino or diphenylamino group, and materials which contain two or more such aromatic rings bridged at, e.g., the 4 position. Thiophenoxy radical analogs of such phenoxy radicals are also contemplated. Typical stable nitroxy radicals are those having the general formula $R_1R_2N$—O., where $R_1$ and $R_2$ are tertiary alkyl groups, or where $R_1$ and $R_2$ together with the N atom form a cyclic structure, preferably having tertiary branching at the positions alpha to the N atom. Examples of hindered nitroxy radicals include 2,2,5,5-tetraalkylpyrrolidinoxyl radicals, as well as those in which the 5-membered heterocycle ring is fused to an alicyclic or aromatic ring, hindered aliphatic dialkylaminoxyl and iminoxyl radicals such as $(R_3C)_2N$—O. and $R_2C=N$—O., diarylaminoxyl and arylalkylaminoxyl radicals such as the nitroxyl radical from alkyl diphenylamine, $(R—Ar)_2N$—O., nitroxyl derivatives of dihydroquinoline light stabilizers and antiozonants (available from Ciba-Geigy), in monomeric and polymeric forms, and nitroxyl radicals derived from dibenzo-heterocycles such as phenothiazines and phenoxazines. A specific, preferred example is 2,2,6,6-tetramethyl-1-piperidinyloxy, which is available from Aldrich Chemical Company under the trade name TEMPO™. This material is understood to be a representative of materials of the general structure

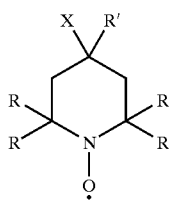

where each R is independently alkyl or aryl, R' is hydrogen, alkyl, or aryl, X is hydrogen, alkyl, aryl, alkoxyl, carbalkoxy, carboxyalkyl, carboxamido- (—NHC(O)— lower alkyl), or chloro, or where R' is absent and X is =O or =S. Esters and ethers thereof are also contemplated.

Hindered amine stabilizers are described in detail in *Polymer Stabilization and Degradation*, P. P. Klemchuk, Editor, American Chemical Society, Symposium Series 280, 1985, pages 55–97. These materials are closely related structurally to nitroxy radicals and can be converted thereinto by known means. Accordingly, the hindered amine structures illustrated in particular on pages 56, 58, 61, 91, 92, 94, 95, 97, and 97 of the above-cited document can be taken as illustrative of characteristic structures of a variety of stable nitroxy radicals.

The amount of stable free radical agent employed in the polymerization of the first block is typically 0.001 to 0.01 moles per mole of monomer, particularly for polymer molecular weights in the range of 10,000 to 100,000. Specific amounts can readily be determined and appropriately adjusted by the person skilled in the art.

Free Radical Initiators

Free radical initiators include peroxy compounds, peroxides, hydroperoxides, and azo compounds which decompose thermally to provide free radicals.

Free radical generating reagents are well know to those skilled in the art. Examples include benzoyl peroxide, t-butyl perbenzoate, t-butyl metachloroperbenzoate, t-butyl peroxide, sec-butylperoxydicarbonate, azobisisobutyronitrile, and the like. Numerous examples of free radical-generating reagents, also known as free-radical initiators, are mentioned in the above-referenced texts by Flory and by Bovey and Winslow. An extensive listing of free-radical initiators appears in J. Brandrup and E. H. Immergut, Editor, "Polymer Handbook", 2nd edition, John Wiley and Sons, New York (1975), pages II-1 to II-40. Preferred free radical-generating reagents include t-butyl peroxide, t-butyl hydroperoxide, t-amyl peroxide, cumyl peroxide, t-butyl peroctoate, t-butyl-m-chloroperbenzoate and azobisisovaleronitrile.

The free radical initiators are generally used in an amount from 0.01 to about percent by weight based on the total weight of the reactants. Preferably, the initiators are used at about 0.05 to about 2 percent by weight. The molar ratio of free radical initiator to stable free radical agent is from about 0.2 to about 2:1, preferably from about 0.8:1 to about 1.2:1, even more often from about 1.1 to 1.2:1, frequently 0.8–0.9:1.

The reaction is usually conducted at temperatures ranging between about 80° C. to about 200° C., preferably between about 130° C. to about 170° C. Considerations for determining reaction temperatures include reactivity of the system and the half-life of the initiator at a particular temperature.

The choice of free radical generating reagent can be an important consideration. For example, when the reaction is conducted with a solvent such as a hydrocarbon oil, grafting of monomer onto the oil diluent may occur. It has been observed that the choice of initiator affects the extent of grafting of the monomer onto the oil diluent. Reducing the amount of monomer grafted onto the diluent usually results in an increased amount of monomer incorporated into the polymer block.

Peroxy- and azo-compounds are preferred.

Promoter

To further facilitate the polymerization, the polymerization can be conducted in the presence of a strong acid or an amine salt of an acid in an amount suitable to enhance the rate of polymerization, that is to say, a catalytic amount. Such an acid will normally have a $pK_a$ as measured in water of less than 4, preferably less than 2.5, and more preferably less than 2. A preferred amount of the acid or amine salt is an amount sufficient to reduce the pH of the reaction medium to 4 to 5. Otherwise stated, the ratio of an organic acid to the amount of the sterically hindered stable free radical is preferably about 1:1 to about 1:20, often to about 1:11 by weight. Either organic or inorganic acids can be used, for example mineral acids, sulfonic acids, acidic clays, organic sulfonic acids, carboxylic acids, acidic salts of any of these acids, and monoesters of sulfurous- and sulfuric acids. Preferred acids include carboxylic acids, sulfonic acids, phosphonic acids, and phosphoric acids. One such acid which has been successfully employed in the past is camphorsulfonic acid. See, for instance, U.S. Pat. No. 5,401,804. Other feasible acids include methane sulfonic acid, toluene sulfonic acid, sulfonic acid functionalized resins, 2-fluoro-1-methylpyridinium p-toluenesulfonate, trifluoromethanesulfonic acid, 3,5-di-t-butyl-4-hydroxybenzenesulfonic acid, and pyridinium p-toluenesulfonate.

The medium for polymerization of the blocks is not particularly critical and can be any such medium in which polymerization can be effected. Preferably, the medium is one in which the reactants are soluble, often a substantially inert normally liquid organic diluent. Examples include alkyl aromatics, preferably in relatively small amounts so that a relatively high concentration of monomer can be maintained. Solvents which readily transfer hydrogen atoms under radical conditions are preferably avoided. If such an alternative medium is used, it should also be one from which the initially formed block can be separated, such as by filtration, precipitation into a nonsolvent, or evaporation of the medium. Thus, the first block can be isolated prior to the further reaction to prepare the second block, while retaining the active polymerization site thereon. This retention of the active polymerization site is a characteristic and a benefit of the use of the stable free radical initiator. For best results in retaining the active polymerization site, processing of the polymer in the presence of hydrogen atom transfer agents, particularly at elevated temperatures, should be avoided.

Alternatively, polymerization can be conducted in the substantial absence of medium or solvent, that is, virtually neat. Trace amounts of materials which may be considered 'diluents' as defined herein may be present. Trace amounts are essentially impurity amounts and are not amounts that have any significant effect on the process or the product.

Alternatively, the process to prepare subsequent blocks may be conducted without isolation of the preceding block.

The polymerization of monomers to prepare the second block can be accomplished either with or without employing additional free radical initiator and or promoter. Often, additional promoter or initiator is beneficial, and sometimes is necessary, to enable polymerization of the second block to proceed, especially at an acceptable rate.

In the process to prepare the A-B block copolymer, the weight ratio of vinyl aromatic monomer to acrylic monomer typically ranges from about 20:1 to about 1:20, preferably, from about 5:1 to about 1:10, most preferably from about 35:65 to about 65:35.

In the process of this invention, from about 5 to about 95 mole % of the charge comprising the at least one vinyl aromatic monomer, preferably, from about 50 to about 80 mole %, is polymerized to prepare the stabilized active polymer block (A). To the mixture of A-block polymer and unreacted vinyl aromatic monomer is then added the at least one acrylic monomer and optionally, additional vinyl aromatic monomer which is then further reacted to form the (vinyl aromatic-co-acrylate) (B) block. Optionally, additional free radical initiator and/or promoter may be utilized.

The polymerization process may be terminated by (d) reducing the temperature below the polymerization temperature of the monomers. The block copolymer may then be further worked up and isolated as a substantially solvent free dry polymer by stripping off diluent, if any, and volatile unreacted monomer, or by precipitation of the polymer from a solvent in which the polymer has limited solubility, and which solvent selectively takes up unreacted monomer.

Additional blocks may be incorporated into the polymer of this invention.

In one embodiment, the additional block is made up of the same vinyl aromatic monomers employed to generate the first block, block (A). The additional block is incorporated by (e) after step (c) adding and polymerizing, at an elevated temperature, at least one additional vinyl aromatic monomer wherein said additional vinyl aromatic monomer has the same composition as that charged to generate block (A). In this embodiment, the amount of monomers charged to generate the additional block ranges from about 0.2 to about 5 times that used to prepare the first (A) block. The additional monomer is charged and polymerized, optionally with additional free-radical initiator, in the same fashion as the preparation of the (B) block. The resulting polymer is an A-B-A triblock polymer.

In another embodiment, the additional block is made up of monomers selected from the group consisting of vinyl aromatic monomers, acrylic monomers, and mixtures thereof, wherein the composition of the third monomers is different from those employed to generate the (A) and (B) blocks. This additional block is incorporated by (f) after step (c) adding and polymerizing at an elevated temperature, at least one monomer selected from the group consisting of vinyl aromatic monomers, acrylic monomers, and mixtures thereof, wherein the composition of the third monomer is different from the monomers employed in steps (a)–(c). The additional monomers are charged and polymerized, optionally with additional free-radical initiator. The resulting polymer is an A-B-C triblock polymer. The weight ratio of the of monomers charged to prepare the additional block to the total weight of vinyl aromatic monomers charged to prepare the (A) and (B) blocks ranges from about 1:5 to about 10:1.

In a preferred embodiment, the vinyl aromatic monomer is selected from the group consisting of styrenes comprising at least one of styrene, an α- lower alkyl substituted styrene, vinyl benzene sulfonic acid, and styrenes having $C_{1-4}$ alkyl ring substituents, and the acrylic monomer is selected from the group consisting of acrylic acids, esters of acrylic acids, preferably those containing from 2 to about 50 carbon atoms in the ester group, acrylic amides, and acrylonitriles. Especially preferred is wherein the styrenes comprise styrene and the acrylic monomer comprises at least one methacrylic acid ester, especially an aliphatic ester containing from 9 to about 23 carbon atoms in the ester groups.

The process of this invention is conducted to provide copolymers having weight average molecular weights ($\overline{M}_w$) ranging from about 1,000, more often from about 3,000, even more often from about 5,000 to about 500,000, often from about 10,000 to about 250,000, frequently up to about 25,000, frequently from about 3,000 to about 25,000, often up to about 15,000. In another embodiment, the resulting block copolymer has weight average molecular weight ranging from about 5,000 to about 250,000, often up to about 150,000, frequently up to about 100,000.

The molecular weight of the polymer is the total of the molecular weights of the individual blocks. In a preferred embodiment, the $\overline{M}_w$ of the A-block ranges from about 4,000 to about 80,000 and the $\overline{M}_w$ of the B-block ranges from about 4,000 to about 80,000 Preferred A:B weight ratios are 1:1 up to 2:1, preferably up to about 1.5:1. Molecular weights of the B-block and of third blocks are determined by subtracting the molecular weight of the A-block or for polymers containing more than two blocks, the total molecular weight of the previously prepared blocks, from the total molecular weight of the polymer.

As noted hereinabove, the block copolymers of this invention may comprise a third block. When the block copolymer is a triblock copolymer, the molecular weight of the third block typically ranges from about 4,000 to about 80,000.

Specific molecular weights of polymer are frequently dictated by the intended use. For the copolymers of this invention, when the polymer is intended to be used in gear lubricants, preferred weight average molecular weights ($\overline{M}_w$) for each block range from about 5,000 to about 20,000, preferably up to about 12,000, with the preferred A-block to B-block $\overline{M}_w$ ratio of about 1–1.4:1. For use in hydraulic oils and in automatic transmission fluids, typical molecular weights range from about 10,000 to about 30,000, preferably up to about 20,000. For engine oils, for example for gasoline passenger car engines and for heavy duty diesel engines, the molecular weight for each block frequently ranges from about 40,000 to about 100,000, often up to about 80,000.

Molecular weights of the polymers are determined using well known methods described in the literature. Examples of procedures for determining the molecular weights ($\overline{M}_w$ and number average molecular weight, $\overline{M}_n$) are gel permeation chromatography (GPC) (also known as size-exclusion chromatography), light scattering, and vapor phase osmometry (VPO). The GPC technique employs standard materials against which the samples are compared. For best results, standards that are chemically similar to those of the sample are used. For example, for polystyrene polymers, a polystyrene standard, preferably of similar molecular weight, is employed. When standards are dissimilar to the sample, generally relative molecular weights of related polymers can be determined. For example, using a polystyrene standard, relative, but not absolute, molecular weights of a series of polymethacrylates may be determined. These and other procedures are described in numerous publications including:

P. J. Flory, "Principles of Polymer Chemistry", Cornell University Press (1953), Chapter VII, pp 266–316, and "Macromolecules, an Introduction to Polymer Science", F. A. Bovey and F. H. Winslow, Editors, Academic Press (1979), pp 296–312.

W. W. Yau, J. J. Kirkland and D. D. Bly, "Modem Size Exclusion Liquid Chromatography", John Wiley and Sons, New York, 1979.

The following examples are intended to illustrate several compositions of this invention as well as means for preparing same. Parts in the following examples are, unless otherwise indicated, parts by weight. The amounts shown are sometimes expressly indicated as parts by weight (pbw) or parts by volume (pbv). The relationship between parts by weight and parts by volume is as grams to milliliters. Temperatures are in degrees Celsius (° C.). Filtrations employ a diatomaceous earth filter aid. Molecular weight and polydispersity (PDI) values are determined using GPC. In several examples, the extent of conversion is determined during processing. Conversions are determined by taking an aliquot from the reaction mixture, precipitating polymer from the aliquot using methanol, and calculating the % of monomer converted to polymer. Molecular weight values for these in-process samples are obtained using GPC, with polystyrene standard, employing two 500 mm×10 mm columns in tandem, a Jordi-Gel Mixed Bed, Catalog # 15005, and a Jordi-Gel 500 Å, provided by Jordi Associates, Bellingham Mass., USA. Values for the products of the examples are generated using GPC, with polystyrene standard, employing in tandem, four 300mm×7.5 mm columns obtained from Polymer Laboratories Inc., Amherst, Mass. USA, consisting of three PLgel mixed bed C; 5 μm, catalog #1110-6500 columns and one PLgel 100 Å, catalog #1210-6120 column.

EXAMPLE 1

Part A

A 1-l resin kettle, equipped with a stirrer, thermocouple, $N_2$ inlet and condenser is charged with 150 parts styrene, 0.78 part TEMPO, 1.01 part benzoyl peroxide, and 0.6 part camphor sulfonic acid and heated to 130° C. with stirring for 2.25 hours with $N_2$ flow. An aliquot is removed and isolated for GPC analysis which shows a 60–70% conversion to polystyrene (polystyrene standard) and an $\overline{M}_w$ of 29,526. The temperature is lowered to 110° C. and 150 parts $C_{12-15}$ methacrylate are added as the temperature drops to 70° C. The batch temperature is increased to 130° C. with stirring and held for 4.5 hours. The mixture is cooled to 80° C., and 600 ml of toluene are added with stirring. The solution is allowed to cool back to room temperature and precipitated in 4500 pbv of methanol. The methanol slurry is filtered through a sintered glass frit and the solid is collected, vacuum dried at room temperature, yielding 215 parts of product with a $\overline{M}_w$=47,343, $\overline{M}_n$=29,179 and PDI=1.62.

Part B

A blend is made up containing 35 parts of the product of Part A of this example, 50 parts of 90 Neutral mineral oil (Esso) and 15 parts 40 neutral hydrotreated naphthenic oil (Cross L-40, Cross Oil Co.).

EXAMPLE 2

A 1-liter resin kettle, equipped with a stirrer, thermocouple, $N_2$ inlet and condenser is charged with 150 parts styrene, 0.7 part TEMPO, 1.01 part benzoyl peroxide, and 0.6 part camphor sulfonic acid, and heated, with stirring and $N_2$ flow to 130° C. for 1.75 hours. An aliquot is removed and isolated for GPC analysis which shows a polystyrene polymer with a $\overline{M}_w$ of 27,132 (polystyrene standard). The mixture is cooled to 70° C. and 150 parts $C_{12-15}$ methacrylate are added to the reaction mixture and heated to 130° C. for 1 hour, at which time the mixture is still not viscous. A second portion (0.6 part) camphor sulfonic acid is added and the mixture is stirred for 2 hours at 130° C., at which time the mixture becomes very viscous. The mixture is then cooled to <100° C. and 500 pbv toluene are added with stirring. The solution is allowed to cool back to room temperature and is precipitated into 4500 pbv methanol. The methanol slurry is filtered through a sintered glass frit and the solid collected is vacuum dried at room temperature, yielding 225 parts of solid polymer with a GPC $\overline{M}_w$=65,328, $\overline{M}_n$=38,585, and PDI 1.69.

EXAMPLE 3

A resin kettle is charged with 210 parts styrene, 3.3 parts TEMPO, and 5.6 parts benzoyl peroxide. The materials are heated under $N_2$ to 130° C. with slow stirring followed by addition of 0.8 part camphorsulfonic acid the temperature is maintained for 3.8 hours, taking aliquots periodically, which aliquots are precipitated from methanol and the conversion is determined, resulting in the following:

| Time | % Conversion | $\overline{M}_n$ | $\overline{M}_w$ | PDI |
|---|---|---|---|---|
| 2 hr | 48 | | | |
| 3 hr | 62 | | | |
| 3.5 hr | 70 | 5,167 | 8,949 | 1.73 |

After 3.8 hours, 190 parts of $C_{12-15}$ methacrylate and 0.8 part camphorsulfonic acid are charged followed by heating for 3 hours at 130° C. The batch is mixed with 400 parts toluene then stirred for 0.2 hours as the mixture cools. The toluene mixture is precipitated from 4000 pbv methanol, separated by filtration, and the polymer is vacuum dried. The dried polymer has $\overline{M}_n$=15,724, $\overline{M}_w$=21,369, and PDI=1.36.

EXAMPLE 4

The procedure of Example 3 to prepare the styrene block is followed employing 210 parts styrene, 4.7 parts TEMPO, 8 parts benzoyl peroxide and 0.8 part camphorsulfonic acid. Conversion over time is given in the following table:

| Time | % Conversion | $\overline{M}_n$ | $\overline{M}_w$ | PDI |
|---|---|---|---|---|
| 2 hr | 40 | | | |
| 3 hr | 45 | | | |
| 4 hr | 60 | | | |
| 5 hr | 60 | | | |
| 5.5 hr | 66 | | | |
| 6.75 hr | 70 | 4,569 | 6,913 | 1.51 |

After 6.75 hours, 190 parts $C_{12-15}$ methacrylate and 0.8 part camphorsulfonic acid are added and the materials are heated for 4.5 hour at 130° C. At this time 0.08 part t-butyl peroxide is added, followed by heating for 3 more hours. After each of 5.5 and at 6.5 hours, 0.08 part portions of t-butyl peroxide are added. The materials are diluted with 300 parts by volume toluene and are precipitated into 3000 parts by volume methanol, and dried. The dried polymer has $\overline{M}_n$=9,204, $\overline{M}_w$=11,968, PDI=1.30.

EXAMPLE 5

A resin kettle is charged with 50 parts styrene, 0.78 part TEMPO, and 1.35 parts benzoyl peroxide and 0.3 part camphorsulfonic acid. The materials are heated in an oil bath at 133° C. for 3.25 hours at which time the conversion is 73%. At this point the polymer has $\overline{M}_n$=6,620, $\overline{M}_w$=11,424, and PDI=1.73. At this time are added 40 parts $C_{12-15}$ methacrylate, the temperature is maintained for 1 hour, 0.3 part camphorsulfonic acid and 0.08 part t-butyl peroxide are added. The temperature is increased to 140° C. and is maintained for 3 hours, adding 0.08 part portions of t-butyl peroxide after the first and second hour. The materials are diluted with 30 parts by volume toluene, then the polymer is precipitated into 1000 parts by volume methanol. The dried polymer has $\overline{M}_n$=17,098, $\overline{M}_w$=24,679 and PDI=1.44.

EXAMPLE 6

A resin kettle is charged with 200 parts styrene, 0.417 part TEMPO, 0.54 part benzoyl peroxide, and 0.8 part camphorsulfonic acid. The materials are heated at 130° C. for 4 hours. At this time the polymer has $\overline{M}_n$=19,400, $\overline{M}_w$=59,656, and PDI=3.1. A mixture of 175 parts $C_{12-15}$ methacrylate and 0.8 part camphorsulfonic acid. After heating at 130° C. for 1 hour, the viscous mixture is diluted with 25 parts by volume xylene, with additional dilutions with 25 parts by volume xylene after 0.5 hour then after 0.25 hour. After a total time at temperature of 2 hours, the batch is cooled by the addition of 400 parts by volume toluene. Of this mixture, 300 parts are diluted with 1000 parts by volume methanol to precipitate the polymer, yielding 100 parts of white powder having $\overline{M}_n$=55,122, $\overline{M}_w$=137,241, and PDI=2.49.

EXAMPLE 7

A resin kettle charged with 75 parts styrene, 1.17 parts TEMPO, and 1.81 parts benzoyl peroxide is heated to 130° C. under $N_2$, whereupon 0.15 part camphorsulfonic acid is added followed by heating for 7 hours, obtaining % conversion vs. time as follows:

| Time | % Conversion | $\overline{M}_n$ | $\overline{M}_w$ | PDI |
| --- | --- | --- | --- | --- |
| 2 hr | 3 | | | |
| 3 hr | 13.5 | | | |
| 4 hr | 27 | 5,167 | 8,949 | 1.73 |
| 6 hr | 50 | | | |
| 7 hr | 64 | 4,091 | 6,358 | 1.55 |

After 7 hours heating, the batch is diluted with toluene and precipitated into methanol. The polymer is then dried. Product has $\overline{M}_n$=6,264, $\overline{M}_w$=7,614 and PDI=1.22.

EXAMPLE 8

Part A

The procedure of Example 7 is followed except 2.02 parts benzoyl peroxide are used, obtaining the following:

| Time | % Conversion | $\overline{M}_n$ | $\overline{M}_w$ | PDI |
| --- | --- | --- | --- | --- |
| 2 hr | 36 | | | |
| 3 hr | 46 | | | |
| 4 hr | 58 | | | |
| 6 hr | 72 | | | |
| 7 hr | 73 | 4,684 | 7,919 | 1.69 |

Employing the 4 Polymer Laboratories columns in tandem, $\overline{M}_n$=7,520, $\overline{M}_w$=9,377 and PDI=1.25.

Part B

A resin kettle is charged with 31 parts of the product of Part A of this example, 11 parts styrene, and 38 parts $C_{12-15}$ methacrylate, which is then heated to 130° C. under $N_2$, whereupon 0.16 part camphorsulfonic acid is added followed by heating for 7 hours, maintaining 130° C. The batch is diluted with 130 pbv toluene and is precipitated into 1400 pbv of a 2:1 mixture of methanol and propanol. Employing Polymer Laboratories columns, $\overline{M}_n$=13,924, $\overline{M}_w$=17,496 and PDI=1.26.

EXAMPLE 9

A resin kettle charged with 210 parts styrene, 2.08 parts TEMPO, 0.95 part 2-fluoro-1-methylpyridinium para-toluenesulfonate, and 2.69 parts benzoyl peroxide is heated to 135° C. under $N_2$, followed by heating for 5.25 hours, obtaining % conversion vs. time as follows:

| Time | % Conversion | $\overline{M}_n$ | $\overline{M}_w$ | PDI |
| --- | --- | --- | --- | --- |
| 2 hr | 27 | | | |
| 3 hr | 49 | | | |
| 4 hr | 57 | | | |
| 5 hr | 67 | | | |
| 5.25 hr | 74 | 8,235 | 16,387 | 1.99 |

To the batch are added 0.8 part camphorsulfonic acid and 190 parts $C_{12-15}$ methacrylate, followed by stirring for 2 hours at 135° C. The batch is diluted with 400 parts toluene, stirred for 0.2 hour then precipitated into a 5-fold volume of a 2:1 mixture of methanol and propanol. The precipitate is washed with isopropanol then with methanol and dried in vacuo. Employing Polymer Laboratories columns, $\overline{M}_n$=25,373, $\overline{M}_w$=35,518 and PDI=1.40.

EXAMPLE 10

Part A

A reactor is charged with 600 parts styrene, 3.69 parts TEMPO, 4.84 parts benzoyl peroxide and 1.08 parts camphorsulfonic acid. The materials are stirred, under $N_2$, at 125° C. for a total of 9 hours, cooled to 70° C. and diluted with 300 parts by volume of toluene. The diluted materials are transferred to a larger flask, are further diluted with 300 parts by volume of toluene and precipitated from 5000 parts by volume methanol. $\overline{M}_n$=28,840, $\overline{M}_w$=40.693 and PDI=1.95.

Part B

A resin kettle is charged with 20 parts of the product of Part A of this Example and 9.8 parts maleic anhydride in 20 parts toluene. The materials are heated to 125° C., 3 parts styrene are charged and an additional 7.4 parts toluene are added periodically over 2 hours, at which time the orange, clear liquid is extremely viscous. An additional 5 parts toluene are added and the materials are mixed for 1 hour then 100 parts by volume toluene are added and the mixture is transferred to a separatory funnel. The polymer is precipitated from 1,200 parts methanol then collected and dried. $\overline{M}_n$=35,015, $\overline{M}_w$=53,337 and PDI=1.52.

EXAMPLE 11

A resin kettle is charged with 235.3 parts styrene, 4.25 parts benzoyl peroxide, 2.72 parts 4-hydroxy TEMPO and 1 part camphorsulfonic acid. The materials are heated to 125° C., whereupon an exotherm up to 144° C. is observed at which time the styrene monomer refluxes. The material are allowed to cool to 125° C. After heating at 125° C. for 7 hours, 100 parts toluene are added followed by stirring at 110° C. for 0.75 hour. At this point a sample shows styrene conversion to be 93.6%. The materials are cooled overnight then a warm solution of 122.6 parts maleic anhydride in 100 parts toluene is added followed by heating to 125° C. An additional 115.1 parts styrene are added over 2 hours then an additional 100 parts toluene. The materials are stirred at 125° C. for 2 hours; the materials become vis cous. The materials are combined with 600 parts toluene then the polymer is precipitated from 4,000 parts by volume methanol, collected by vacuum filtration and dried. Polystyrene (A) block has $\overline{M}_n$=13,423, $\overline{M}_w$=18,371 and PDI=1.37. The product has $\overline{M}_n$=22,610, $\overline{M}_w$=55,687 and PDI=2.46.

A solution of 100 parts of the toluene solution of the product of this example and 600 parts additional toluene is precipitated from 4000 pbv of methanol providing a white solid.

EXAMPLE 12

The procedure of Example 5 is repeated except 60 parts styrene are employed. After the initial 3 hours, conversion is 75%, $\overline{M}_n$=7761, $\overline{M}_w$=13,497, whereupon the methacrylate monomers are added. Product analyses: $\overline{M}_n$=11,365, $\overline{M}_w$=26,091, PDI 2.30.

EXAMPLE 13

A resin kettle is charged with 60 parts styrene, 1.04 part TEMPO, 1.8 parts benzoyl peroxide and 0.3 part camphorsulfonic acid. The materials are heated in an oil bath at 133° C. for 6 hours at which time the conversion is 68%. At this point the polymer has $\overline{M}_n$=5,875, $\overline{M}_w$=9,386, and PDI=1.61. At this time are added 40 Parts $C_{12-15}$ methacrylate and the temperature is maintained at 140° C. for 1 hour. At this point the polymer has $\overline{M}_n$=9,331, $\overline{M}_w$=18,538, and PDI=1.99. Camphorsulfonic acid (0.3 part) and 0.08 part t-butyl peroxide are added. The temperature is maintained at 140° C. for 3 hours, adding, 0.08 part portions of t-butyl peroxide after the first and second hour. The materials are diluted with 30 parts by volume toluene, then the polymer is precipitated into 1000 parts by volume methanol. The dried polymer has $\overline{M}_n$=8,761, $\overline{M}_w$=18,756, and PDI=2.09.

As noted hereinabove, acid and/or anhydride group containing copolymers may be further reacted with suitable reactants to generate acid and/or ester group containing copolymers. Examples of such materials follow:

EXAMPLE 14

A reactor is charged with 600 parts of the toluene containing solution of Example 11 and 58.7 parts of a $C_{12-18}$ alcohol mixture (ALFOL® 1218, Vista Chemical, Westlake, La.). While heating, with $N_2$ purge, toluene is removed. At 125° C. the materials are viscous and clear. The materials are heated for 3 hours at 125° C. followed by the addition over 1.5 hours of a solution of 3.6 parts methanesulfonic acid in 59 parts of $C_{8-10}$ alcohol mixture (ALFOL 810). The materials are refluxed for 5 hours at 135° C. while collecting a total of 4.1 part aqueous distillate. At this time materials have acid number (phenolphthalein)=30.7 and (bromophenol blue)=6.5. An additional 26 parts of Alfol 810 are charged and refluxing is continued for a total of 24 hours. At this time materials have acid number (phenolphthalein)=14.1 and (bromophenol blue)=2.5. The methanesulfonic acid is then neutralized with 1.5 parts 50% aqueous NaOH. A hindered phenol (0.6 parts) is added. The materials are vacuum stripped to 150° C. and 20 mm Hg. An additional 0.6 parts hindered phenol is added, flask contents are 365.9 parts by weight. The residue is mixed with 365.9 parts mineral oil (65N, PetroCanada). To facilitate filtration of the viscous residue, the oil solution is mixed with 500 parts toluene then filtered then vacuum stripped to remove toluene diluent. Viscosity (D-445 @ 100° C.=3770. Total acid number=7.9.

EXAMPLE 15

A container is charged with 168.7 parts of the product of Example 14. With $N_2$ blowing, the materials are heated to 150° C. To the heated materials is added 0.53 part aminopropyl morpholine over 0.25 hour followed by heating for 1.5 hours at 150° C. The materials are the product. % N=0.07, Total acid number=7.95, total base number=1.02.

The Oil of Lubricating Viscosity

The lubricating compositions and methods of this invention employ an oil of lubricating viscosity, including natural or synthetic lubricating oils and mixtures thereof. Mixture of mineral oil and synthetic oils, particularly polyalphaolefin oils and polyester oils, are often used.

Natural oils include animal oils and vegetable oils (e.g. castor oil, lard oil and other vegetable acid esters) as well as mineral lubricating oils such as liquid petroleum oils and solvent-treated or acid treated mineral lubricating oils of the paraffinic, naphthenic or mixed paraffinic-naphthenic types. Hydrotreated or hydrocracked oils are included within the scope of useful oils of lubricating viscosity. Hydrotreated naphthenic oils are well known. Oils of lubricating viscosity derived from coal or shale are also useful.

Synthetic lubricating oils include hydrocarbon oils and halosubstituted hydrocarbon oils such as polymerized and interpolymerized olefins, etc. and mixtures thereof, alkylbenzenes, diphenyl alkanes, polyphenyl, (e.g., biphenyls, terphenyls, alkylated polyphenyls, etc.), alkylated diphenyl ethers and alkylated diphenyl sulfides and their derivatives, analogs and homologues thereof and the like.

Alkylene oxide polymers and interpolymers and derivatives thereof, and those where terminal hydroxyl groups have been modified by esterification, etherification, etc., constitute other classes of known synthetic lubricating oils that can be used.

Another suitable class of synthetic lubricating oils that can be used comprises the esters of dicarboxylic acids and those made from $C_5$ to $C_{12}$ monocarboxylic acids and polyols or polyether polyols.

Other synthetic lubricating oils include liquid esters of phosphorus-containing acids, polymeric tetrahydrofurans, alkylated diphenyloxides and the like.

Unrefined, refined and rerefined oils, either natural or synthetic (as well as mixtures of two or more of any of these) of the type disclosed hereinabove can used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

The lubricating oil compositions of the instant invention generally comprise a major amount of an oil of lubricating viscosity and a minor amount of the block copolymer of this invention. As is discussed in greater detail hereinafter, the lubricating oil compositions of this invention may contain minor amounts of other additives.

By major amount is meant more than 50% by weight. The total amount of oil of lubricating viscosity in a lubricating oil composition of this invention constitutes a major amount. Thus, for example, when 2 or more oils of lubricating viscosity are employed in a lubricating oil composition of this invention, the total weight percent of the individual oils constitutes a major amount, i.e., more than 50% by weight of the lubricating oil composition Accordingly, all of the other components that are present in a lubricating oil composition of this invention will total less than 50% by weight of the lubrication oil composition, i.e., a minor amount.

Other Additives

As mentioned, the compositions of this invention may contain minor amounts of other components. The use of such additives is optional and the presence thereof in the compositions of this invention will depend on the particular use and level of performance required. Accordingly, these optional components may be included or excluded.

The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, oxidation inhibiting agents, metal passivating agents, pour point depressing agents, extreme pressure agents, anti-wear agents, friction modifiers, color stabilizers and anti-foam agents. The above-mentioned dispersants and viscosity improvers are used in addition to the additives of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbyl and trihydrocarbyl phosphites, molybdenum compounds, and the like.

Auxiliary viscosity improvers (also sometimes referred to as viscosity index improvers) may be included in the compositions of this invention. Viscosity improvers are usually polymers, including polyisobutenes, polymethacrylic acid esters, diene polymers, polyalkyl styrenes, alkenylarene-conjugated diene copolymers and polyolefins. Multifunctional viscosity improvers, other than those of the present invention, which also have dispersant and/or antioxidancy properties are known and may optionally be used in addition to the products of this invention. Such products are described in numerous publications including those mentioned in the Background of the Invention. Each of these publications is hereby expressly incorporated by reference.

Pour point depressants are a particularly useful type of additive often included in the lubricating oils described herein. See for example, page 8 of "Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. No. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by at least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as anine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,415,750 | 3,630,904 |
| 3,184,474 | 3,433,744 | 3,632,510 |
| 3,215,707 | 3,444,170 | 3,632,511 |
| 3,219,666 | 3,448,048 | 3,697,428 |
| 3,271,310 | 3,448,049 | 3,725,441 |
| 3,272,746 | 3,451,933 | 4,194,886 |
| 3,281,357 | 3,454,607 | 4,234,435 |
| 3,306,908 | 3,467,668 | 4,491,527 |
| 3,311,558 | 3,501,405 | 5,560,755 |
| 3,316,177 | 3,522,179 | 5,696,060 |
| 3,340,281 | 3,541,012 | 5,696,067 |
| 3,341,542 | 3,541,678 | 5,779,742 |
| 3,346,493 | 3,542,680 | 5,856,279 |
| 3,351,552 | 3,567,637 | 5,912,213 |
| 3,381,022 | 3,574,101 | RE 26,433 |
| 3,399,141 | 3,576,743 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Interpolymers of oil-solubilizing monomers such as decyl methacrylate, vinyl decyl ether and high molecular weight olefins with monomers containing polar substituents, e.g., aminoalkyl acrylates or methacrylates, acrylarnides and poly-(oxyethylene)-substituted acrylates. These may be characterized as "polymeric dispersants" and examples thereof are disclosed in the following U.S. patents

| | |
|---|---|
| 3,329,658 | 3,687,849 |
| 3,449,250 | 3,702,300 |
| 3,519,565 | 5,696,068 |
| 3,666,730 | |

The above-noted patents are incorporated by reference herein for their disclosures of ashless dispersants.

The above-illustrated additives may each be present in lubricating compositions at a concentration of as little as 0.001% by weight usually ranging from about 0.01% to about 20% by weight, more often from about 1% to about 12% by weight. In most instances, they each contribute from about 0.1% to about 10% by weight.

The compositions of the present invention are present in minor amounts, often amounts ranging from about 1% to about 29% by weight, more often from about 3% to about 10% by weight, even more often from about 5% to about 8% by weight.

Additive Concentrates

The various additives described herein can be added directly to the lubricant. Preferably, however, they are diluted with a substantially inert, normally liquid organic diluent such as mineral oil, naphtha, benzene, toluene or xylene, to form an additive concentrate. These concentrates usually comprise about 5 to about 95%, preferably from about 5 to about 50% by weight, often up to about 40% by weight of the block copolymers of this invention and may additionally contain, one or more other additives known in the art or described hereinabove. Concentrations such as 15%, 20%, 30% or 50% or higher may be employed.

The lubricating compositions of this invention are illustrated by the examples in the following Tables. The lubricating compositions are prepared by combining the specified ingredients, individually or from concentrates, in the indicated amounts and oil of lubricating viscosity to make the total 100 parts by weight. The amounts shown are indicated as parts by weight (pbw) or parts by volume (pbv). Unless indicated otherwise, where components are indicated as parts by weight, they are amounts of chemical present on an oil-free basis. Thus, for example, an additive comprising 50% oil used at 10% by weight in a blend, provides 5% by weight of chemical. Where oil or other diluent content is given, it is for information purposes only and does not indicate that the amount shown in the table includes oil. Amounts of products of examples of this invention include oil content, if any. Where percentages of components are on a volume basis, the examples indicate the amounts of diluent (if any) present in the component as percent by weight diluent.

These examples are presented for illustrative purposes only, and are not intended to limit the scope of this invention. The expression MR refers to metal ratio, the number of equivalents of metal present compared to the number of equivalents that is present for the stoichiometrically neutral product. For example, an overbased composition containing 5 times the stoichiometric number of equivalents of metal has a metal ratio of 5.

Examples A—H

Lubricating oil compositions for heavy duty diesel engines are prepared by mixing 3.78 parts of polyisobutylene ($\overline{M}_n \cong 1000$) substituted succinic anhydride-polyethylene polyamine reaction product, 1.26 parts zinc salt of di-(isopropyl-2-ethyl hexyl) dithiophosphate, 0.28 part di (nonylphenyl)amine, 0.6 part calcium overbased ($MR \cong 1.1$) sulfur-coupled polypropylene phenol, 1.54 parts calcium overbased ($MR \cong 2.8$ alkylbenzene sulfonic acid, 0.37 part magnesium overbased ($MR \cong 14.7$) alkylbenzene sulfonic acid, 0.9 part styrene-alkyl maleate copolymer neutralized with aminopropyl morpholine, and 0.01 part silicone antifoam into mineral oil basestock to prepare 100 parts of lubricant. To 100 part portions of this lubricant are added the indicated amounts of the specified examples:

| | Example (pbw) | | | | | | | |
|---|---|---|---|---|---|---|---|---|
| Product of Example | A | B | C | D | E | F | G | H |
| 1 | | | | 2.5 | 5.5 | | | |
| 2 | 2 | 3.5 | 5 | | | | | |
| 6 | | | | | | 2 | 2.5 | 2.75 |

The viscosity index of the heavy duty diesel lubricants illustrated in the foregoing examples is determined employing ASTM Procedure D-2270. The values are presented in the following table. The "Baseline" is the lubricating oil composition before addition of the compositions of this invention.

| | Viscosity (Centistokes) | | |
|---|---|---|---|
| Lubricant Example | 40° | 100° | VI |
| Baseline | 60.48 | 8.28 | 106 |
| A | 79.9 | 10.97 | 125 |
| C | 134.3 | 18.02 | 150 |

-continued

| Lubricant Example | Viscosity (Centistokes) 40° | 100° | VI |
|---|---|---|---|
| D | 82.17 | 11.79 | 136 |
| E | 95.98 | 13.76 | 145 |

Examples I—J

Automatic transmission fluid compositions are prepared by mixing 1.5 parts polyisobutene ($\overline{M}_n \cong 1000$) substituted succinic anhydride-polyethylene polyamine reaction product, 0.15 part dibutyl hydrogen phosphite, 0.25 part boronated polyisobutene ($\overline{M}_n \cong 1000$) substituted succinic anhydride-polyethylene polyamine reaction product, 0.2 part boronated $C_{16}$ epoxide, 0.63 part di-(nonylphenyl) amine, 0.5 part propylene oxide/t-dodecyl mercaptan reaction product, 0.05 part ethoxylated N-fatty alkyl propane diamine, 0.1 part ethoxylated oleyl imidazoline, 0.6 part sulfolene-decyl alcohol reaction product, 0.03 part tolyl triazole, 0.2 part calcium overbased (MR≅1.2) alkyl benzene sulfonate, 0.025 part red dye, and 0.04 part silicone antifoam agent into a mineral oil basestock to prepare 100 parts of lubricant. As indicated in the following Table, the product of Example 1 is added in the indicated proportions to prepare 100 parts of modified lubricant.

|  | Example | |
|---|---|---|
|  | I | J |
| Product of Example (pbw) | 5.0 | 5.5 |

The viscosity index of the automatic transmission fluids illustrated in the foregoing examples is determined employing ASTM Procedure D-2270. The values are presented in the following table, The "Baseline" is the lubricating oil composition before addition of the compositions of this invention.

| Lubricant Example | Viscosity (Centistokes) 40° | 100° | VI |
|---|---|---|---|
| Baseline | 18.74 | 4.19 | 130 |
| I | 26.65 | 6.08 | 187 |
| J | 27.60 | 6.38 | 196 |

Examples K–L

An additive concentrate is prepared by mixing 55.3 parts of a zinc salt of a di(2-ethylhexyl) dithiophosphate/2-ethylhexyl carboxylic acid mixture, 1.2 parts of mixed carboxylic polymer antifoams, 4.12 parts polyisobutene ($\overline{M}_n \cong 1000$) substituted succinic anhydride, 0.47 part poly-(propoxy-ethoxy) ether, 0.55 part alkylaminomethyl tolyl triazole, 4.04 parts of an approximately 50% in oil solution of calcium overbased sulfurized alkyl phenol, 4.04 parts sodium petroleum sulfonate, 21.18 parts of hindered phenol, and 0.18 part tolyltriazole with mineral oil to prepare 100 parts of concentrate.

Hydraulic fluid compositions are prepared by mixing 0.85 part of the foregoing additive concentrate, and the listed amounts of the product of Example 1 into a mineral oil basestock to prepare 100 part by weight of oil compositions.

|  | Example (pbw) | |
|---|---|---|
|  | K | L |
| Product of Example 1 | 7.0 | 7.5 |

The viscosity index of the hydraulic fluid compositions illustrated in the foregoing examples is determined employing ASTM Procedure D-2270. The values are presented in the following table, The "Baseline" is the mineral oil basestock before addition of any additives.

| Lubricant Example | Viscosity (Centistokes) 40° | 100° | VI |
|---|---|---|---|
| Baseline | 20.57 | 4.12 | 100 |
| K | 43.36 | 8.60 | 181 |
| L | — | 9.40 | — |

Example M

A gear lubricant composition is prepared by mixing 10 parts of the product of Example 1, 0.8 part of a styrene-maleate ester-methyl methacrylate copolymer, and 6.5 parts of an additive concentrate containing 20.32 parts of the product obtained by reacting a hydroxypropyl ester of di-(methylamyl) dithiophosphate with $P_2O_5$ and neutralizing with a branched primary amine, 5.38 parts of oleyl amine, 1.54 parts oleylamide, 1.28 parts mineral oil, 0.92 part carboxylic polymer antifoam, 68.19 parts of a sulfurized isobutylene, and 2.37 parts of an 80% in mineral spirits solution of the reaction product of heptylphenol, formaldehyde, and 2,5-dimercapto-1,3,4-thiadiazole in a mineral oil basestock made up of 100 part proportions of 90 Neutral oil and 4 part proportions of 85 Neutral oil, to provide 100 parts of lubricating oil composition. This composition has viscosity index (ASTM D-2270)=211.

Examples N—S

Gear lubricant compositions as in Example M are prepared except the basestock contains only the 90N oil and the product of Example 1 is replaced with the indicated amounts of the product of the listed Examples:

| Product of Example | Example (pbw) | | | | | | | | | | |
|---|---|---|---|---|---|---|---|---|---|---|---|
|  | N | O | P | Q | R | S | T | U | V | W | X |
| 1-B |  |  |  |  |  |  | 30 |  |  |  |  |
| 4 | 15 | 15 |  |  |  |  |  |  |  |  |  |
| 5 |  |  | 13.5 | 15 |  |  |  |  |  |  |  |
| 8B |  |  |  |  | 15 | 17 |  |  |  |  |  |
| 9 |  |  |  |  |  |  |  | 10 | 10.5 | 10.5 | 15 |

The viscosity index of several of the gear lubricants illustrated in the foregoing examples is determined employing ASTM Procedure D-2270. The values are presented in the following table:

| Lubricant Example | Viscosity (Centistokes) 40° | 100° | VI |
|---|---|---|---|
| O | — | 10.28 | — |
| P | 100 | 14.79 | 153 |
| Q | 128.69 | 17.28 | 147 |
| R | 93.96 | 13.88 | 151 |
| S | — | 16.84 | — |
| T | 74.48 | 15.11 | 215 |
| U | 69.47 | 13.9 | 209 |
| V | — | 15.41 | — |
| W | 79.83 | 14.77 | 195 |
| X | 197.5 | 34.07 | 220 |

Example Y

A gear lubricant composition is prepared by mixing 10 parts of the product of Example 1, and 10 parts of an additive concentrate containing 15.53 parts of the product obtained by reacting a hydroxypropyl ester of O,O-di(methylamyl) dithiophosphate with $P_2O_5$ and neutralizing with a branched primary amine, 0.57 part mineral oil, 8.4 parts of magnesium overbased (MR 14.7) alkyl benzene sulfonic acid, 7.1 parts of polyisobutene ($\overline{M}_n$~1000) substituted succinic anhydride/ethylene polyamine reaction product, 2.9 parts glycerol monooleate, 3.2 parts triphenylphosphite, 0.96 part carboxylic polymer antifoam, 41.19 parts of a sulfurized isobutylene, and 5.2 parts of the reaction product of a polyisobutene ($\overline{M}_n$~1000) substituted succinic anhydride/pentaerythritol polyester further reacted with an ethylene polyamine then with 2,5-dimercapto-1,3,4-thiadiazole, in a synthetic oil basestock made up of 84 part proportions of polyalphaolefin (4 centistoke @ 100° C.) (Emery 3004) oil and 16 part proportions of diester oil (3 centistokes) (Emery 2958), to provide 100 parts of lubricating oil composition. This composition has viscosity index (ASTM D-2270)=254.

It is often useful that viscosity improvers not only moderate the loss of viscosity as temperatures are increased, but also that low temperature performance is not adversely affected. Low temperature viscosity (Brookfield Viscosity) of fluid lubricants is determined using ASTM Procedure 2983, Standard Test Method for Low Temperature Viscosity of Automotive Fluid Lubricants Measured by Brookfield Viscometer, which appears in the Annual Book of ASTM Standards, Section 5, ASTM, Philadelphia, Pa., USA. This procedure employs a Brookfield Viscometer which is described in the procedure. The device is available from Brookfield Engineering Laboratories, Stoughton, Mass. USA.

The following compositions illustrated display exemplary performance at low temperature (−40° C.):

| Lubricant Example | Brookfield Viscosity @ −40° C. (centipoise) |
|---|---|
| T | 46,500 |
| V | 62,000 |

Lubricating compositions are often subjected to conditions that can result in shearing of the polymer, resulting in reduction of viscosity improving properties. Accordingly, shear stability of polymer containing blends is frequently important. Several tests are available to measure a compositions resistance to shear under conditions of high shear stress.

On one test, the polymer containing fluid is passed through the nozzle of a diesel injector as set forth in ASTM D-3945, Procedure A, except the fluid is subjected to 250 passes. Employing this procedure, the lubricant of Example W shows viscosity loss of 1.42%.

Another useful test is the KRL Tapered Bearing Shear Test. This is a published standard test entitled "Viscosity Shear Stability of Transmission Lubricants" and is described in CEC L45-T93, available from CEC, 61 New Cavendish Street, London WIM 8AR, England. The same test is also published as DIN 51 350, part 6, and is available from Deutsches Institut fir Normung, Burgerfenshase 6, 1000 Berlin 30, Germany. Both of these references are incorporated herein by reference. Employing this procedure for 20 hours, the lubricant of example V has a shear loss of 35%, example S shows loss of 8.91% and the lubricant of Example O shows a viscosity loss of 3.02%.

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amounts, ranges, and ratio limits set forth herein may be independently combined. As used herein, the expression "consisting essentially of" permits the inclusion of substances which do not materially affect the basic and novel characteristics of the composition under consideration.

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for preparing a block copolymer comprising (A) a poly (vinyl aromatic) block and (B) a poly (vinyl aromatic-co-acrylic) block, said process comprising the steps, (a) polymerizing at an elevated temperature, from about 5 to about 95 mole % of a charge comprising at least one vinyl aromatic monomer to prepare a stabilized active polymer block (A), using a free radical polymerization process, wherein a stable free radical agent is employed during the polymerization, thereby preserving the stabilized active polymerization site at the terminus of the poly (vinyl aromatic) block (A)

wherein the free radical process is conducted employing a free radical initiator selected from the group consisting of peroxy-and azo-compounds, and wherein the molar ratio of free radical initiator to stable free radical agent ranges from 1.1 to 1.2:1;

(b) adding at least one acrylic monomer and optionally, additional vinyl aromatic monomer, to the mixture of residual vinyl aromatic monomer and stabilized active polymer block of (a); and (c) further reacting the mixture of (b) using a free radical process to effect copolymerization of said monomers, thereby preparing a poly-(vinyl aromatic-co-acrylic) block (B).

2. The process of claim 1 further comprising (d) reducing the temperature below polymerization temperature.

3. The process of claim 1 wherein from about 50 to about 80 mole % of the charge comprising at least one vinyl aromatic monomer is polymerized to prepare the stabilized active polymer block (A).

4. The process of claim 1 employing a promoter selected from the group consisting of strong acids.

5. The process of claim 4 wherein the promoter is selected from the group consisting of mineral acids, sulfonic acids, acidic clays, organic sulfonic acids, carboxylic acids, acidic salts of any of these acids, and monoesters of sulfurous- and sulfuric acids.

6. The process of claim 1 wherein an additional block is incorporated by (e) after step (c) adding and polymerizing, at an elevated temperature, at least one additional vinyl aromatic monomer wherein said additional vinyl aromatic monomer has the same composition as that charged to generate block A.

7. The process of claim 6 wherein polymerization to incorporate the additional block is conducted with additional free radical initiator.

8. The process of claim 6 wherein the amount of monomers charged to prepare the additional block ranges from about 0.2 to about 5 times that used to prepare the first (A) block.

9. The process of claim 5 wherein the promoter is an organic sulfonic acid or salt thereof selected from the group consisting of methanesulfonic acid, toluenesulfonic acid, camphorsulfonic acid, sulfonic acid functionalized resins, 3,5-di-t-butyl-4-hydroxybenzenesulfonic acid, trifluoromethanesulfonic acid, and 2-fluoro-1-methylpyridinium p-toluenesulfonate.

10. The process of claim I wherein an additional block is incorporated by (f) after step (c) adding and polymerizing at an elevated temperature, at least one monomer selected from the group consisting of vinyl aromatic monomers, acrylic monomers, and mixtures thereof, wherein the composition of the third monomer is different from the monomers employed in steps (a)–(c).

11. The process of claim 10 wherein polymerization to incorporate the additional block is conducted with additional free radical initiator.

12. The process of claim 10 wherein the ratio of the weight of monomers charged to prepare the additional block to the total weight of vinyl aromatic monomers charged to prepare the (A) and (B) blocks ranges from about 1:5 to about 10:1.

13. The process of claim 1 wherein the block copolymer is isolated as a substantially solvent-free dry polymer by stripping off diluent, if any, and volatile unreacted monomers, or by precipitation of the polymer into a solvent in which the polymer has limited solubility, which solvent selectively takes up unreacted monomer.

14. A block copolymer prepared by the process of claim 13.

15. A lubricating oil composition comprising a major amount of an oil of lubricating viscosity and a minor amount of the polymer of claim 14.

16. The process of claim 1 wherein the vinyl aromatic monomer is selected from the group consisting of styrenes and the acrylic monomer is selected from the group consisting of acrylic acids, esters of acrylic acids, acrylic amides, and acrylonitriles, maleic acid and maleic anhydride.

17. The process of claim 16 wherein the esters of acrylic acids contain from 2 to about 50 carbon atoms in the ester group.

18. The process of claim 16 wherein the styrenes comprise at least one of styrene, an α-lower alkyl substituted styrene, vinyl benzene sulfonic acid, and styrenes having $C_{1-4}$ alkyl ring substituents, and the acrylic monomer comprises at least one methacrylic acid ester.

19. The process of claim 18 wherein the styrenes comprise styrene and the methacrylic acid ester is an aliphatic ester containing from 2 to about 30 carbon atoms in the ester groups.

20. The process of claim 18 wherein the styrenes comprise styrene and the methacrylic acid ester is an aliphatic ester containing from 9 to about 23 carbon atoms in the ester groups.

21. The process of claim 16 wherein the styrenes comprise at least one of styrene, an α-lower alkyl substituted styrene, vinyl benzene sulfonic acid, and styrenes having $C_{1-4}$ alkyl ring substituents, and the acrylic monomer comprises maleic anhydride.

22. The process of claim 1 wherein the stable free radical agent is a phenoxy radical or a nitroxy radical.

23. The process of claim 22 wherein the stable free radical agent is a nitroxy radical of the general formula $R_1R_2N$—O., where $R_1$ and $R_2$ are tertiary alkyl groups, or where $R_1$ and $R_2$ together with the N atom form a cyclic structure having tertiary branching at the positions alpha to the N atom.

24. The process of claim 23 wherein the nitroxy radical is 2,2,6,6-tetramethyl-1-piperidinyloxy.

25. The process of claim 23 wherein the nitroxy radical is selected from the group consisting of 2,2,6,6-tetramethyl-4-hydroxy-1-piperidinyloxy and esters and ethers thereof.

26. The process of claim 1 wherein the (A) block is isolated, while retaining the active polymerization site thereon, prior to the reaction to prepare the (B) block.

27. The process of claim 1 wherein the polymerization to prepare block (B) is conducted without isolation of block (A).

28. The process of claim 1 wherein the polymerization to prepare the (B) block of the polymer is conducted with additional free radical initiator.

29. The process of claim 1 wherein the polymerization is continued to provide a block copolymer having a weight average molecular weight of about 1,000 to about 500,000.

30. The process of claim 29 wherein the polymerization is continued to provide a block copolymer having a weight average molecular weight of about 3,000 to about 25,000.

31. The process of claim 29 wherein the polymerization is continued to provide a block copolymer having a weight average molecular weight of about 10,000 to about 250,000.

32. The process of claim 1 wherein the ratio of the weight of vinyl aromatic monomers charged to the weight of acrylic monomers charged is about 20:1 to about 1:20.

33. The process of claim 32 wherein the weight ratio ranges from about 5:1 to about 1:0.

34. The process of claim 32 wherein the weight ratio ranges from about 35:65 to about 65:35.

35. The process of claim 32 wherein the vinyl aromatic monomer is styrene, the acrylic monomer is a $C_{11-16}$ alkyl methacrylate and the weight ratio is about 1:1.

36. The process of claim 1 conducted in the presence of a substantially inert normally liquid organic diluent.

37. A block copolymer prepared by the process of claim 1.

38. The block copolymer of claim 37 wherein the A-block to B-block $\overline{M}_w$ ratio is about 1–1.4:1.

39. An additive concentrate for preparing lubricating oil compositions comprising from about 5% to about 95% by weight of the polymer of claim 37 and from 95% to about 5% by weight of a normally liquid organic diluent.

40. A lubricating oil composition comprising a major amount of an oil of lubricating viscosity and a minor amount of the additive concentrate of claim 39.

41. A lubricating oil composition comprising a major amount of an oil of lubricating viscosity and a minor amount of the polymer of claim 37.

* * * * *